United States Patent [19]
Scott et al.

[11] Patent Number: 5,748,900
[45] Date of Patent: May 5, 1998

[54] ADAPTIVE CONGESTION CONTROL MECHANISM FOR MODULAR COMPUTER NETWORKS

[75] Inventors: Steven L. Scott, Eau Claire; Richard D. Pribnow, Chippewa Falls; Peter G. Logghe, Chippewa Falls; Daniel L. Kunkel, Chippewa Falls; Gerald A. Schwoerer, Chippewa Falls, all of Wis.

[73] Assignee: Cray Research, Inc., Eagan, Minn.

[21] Appl. No.: 615,700

[22] Filed: Mar. 13, 1996

[51] Int. Cl.⁶ .................................................. G06F 15/16
[52] U.S. Cl. ...................... 395/200.65; 370/229
[58] Field of Search ................ 395/200.06, 200.01, 395/200.65; 370/235, 229

[56] References Cited

U.S. PATENT DOCUMENTS

| | | | |
|---|---|---|---|
| 4,845,710 | 7/1989 | Nakamura et al. | 370/360 |
| 5,195,100 | 3/1993 | Katz et al. | 371/66 |
| 5,233,618 | 8/1993 | Glider et al. | 371/68.1 |
| 5,274,799 | 12/1993 | Brant et al. | 395/575 |
| 5,289,470 | 2/1994 | Chang et al. | 370/429 |
| 5,303,244 | 4/1994 | Watson | 371/10.1 |
| 5,345,565 | 9/1994 | Jibbe et al. | 395/325 |
| 5,402,428 | 3/1995 | Kakuta et al. | 371/10.1 |
| 5,432,784 | 7/1995 | Ozveren | 370/235 |
| 5,452,330 | 9/1995 | Goldstein | 375/257 |
| 5,452,444 | 9/1995 | Solomon et al. | 395/182.04 |
| 5,499,337 | 3/1996 | Gordon | 395/182.04 |
| 5,513,192 | 4/1996 | Janku et al. | 371/50.1 |
| 5,519,844 | 5/1996 | Stallmo | 395/441 |
| 5,522,031 | 5/1996 | Ellis et al. | 395/182.04 |
| 5,530,948 | 6/1996 | Islam | 395/182.04 |
| 5,617,409 | 4/1997 | Ozveren et al. | 370/235 |

OTHER PUBLICATIONS

Gustavson, D B, "The Scalable Coherent Interface and Related Stndards Projects", *IEEE Micro*, 10–22, (Feb., 1992).

"IEEE Standard for Scalable Coherent Interface (SCI)", *IEEE Std 1596–1992*, 1–248, (Mar., 1992).

Patterson, D A, et al., "A Case For Redundant Arrays Of Inexpensive Disks (RAID)", *University of California at Berkeley, Report no. UCB/CSD 87/391*, (Dec. 1987).

Scott,S, "The SCX Channel: A New, Supercomputer-Class System Interconnect", *HOT Interconnects III*, Abstract, pp. 1–11, (Aug. 1–11, 1995).

*Primary Examiner*—John E. Harrity
*Attorney, Agent, or Firm*—Schwegman, Lundberg, Woessner & Kluth, P.A.

[57] ABSTRACT

A congestion control mechanism for a node of a modular computer network system. The mechanism includes registers for maintaining the number of undelivered requests and unanswered requests for the node and registers for the maximum number of such undelivered requests and unanswered requests. The mechanism regulates congestion on the network by throttling back or ratcheting up the allowed number of undelivered requests and unanswered requests based upon the level of busy and non-busy results of such requests and answers. Congestion is also alleviated by the implementation of a set of large and small send and receive buffers. These buffers are configurably partitioned among virtual I/O channels. Each request virtual I/O channel may utilitize congestion control.

22 Claims, 7 Drawing Sheets

FIG. 3A

| | Register Name | Register Description |
|---|---|---|
| 350.1 → | Cd | Current number of undelivered requests |
| 350.2 → | Ca | Current total of unanswered requests |
| 350.3 → | Nd | Current maximum of undelivered requests |
| 350.4 → | Na | Current maximum total of unanswered requests |
| 350.5 → | Ld | Upper limit to which Nd can be set |
| 350.6 → | La | Upper limit to which Na can be set |
| 350.7 → | FreeEcho | Number of nonbusied Echoes |
| 350.8 → | BsyEcho | Number of busied Echoes |
| 350.9 → | FreeResp | Number of nonbusied response packets received as answers |
| 350.10 → | BsyResp | Number of busied response packets received as answers |

FIG. 3B

| | Register Name | Register Description |
|---|---|---|
| 360.1 → | Td | Number of busied Echoes before throttling Nd |
| 360.2 → | Ta | Number of busied answers before throttling Na |
| 360.3 → | Rd | Number of nonbusy Echoes before ratcheting up Nd |
| 360.4 → | Ra | Number of nonbusy answers before ratcheting up Na |
| 360.5 → | NodeLd | Used to establish Ld so that transfers start out at approximately the proper speed |
| 360.6 → | NodeLa | Used to establish La so that transfers start out at approximately the proper speed |

ADAPTIVE CONGESTION CONTROL MECHANISM FOR MODULAR COMPUTER NETWORKS

STATEMENT REGARDING GOVERNMENT RIGHTS

The present invention was made with government support under MDA 972-95-3-0032, awarded by ARPA. The Government has certain rights in this invention.

FIELD OF THE INVENTION

The present invention relates to computer systems and in particular to congestion control of data traffic in modular computer network systems.

BACKGROUND

Modular computer network systems offer the ability to exchange data among individual nodes in the network. Data is exchanged in a series of packets. In a ring-based computer network, Request Packets are routed around the ring from the sending node to the receiving node. Receipt of the Request Packet is acknowledged by an Echo Packet, which in turn, is passed to the node's client computer as a ClientEcho message. Later, the answer to the Request is passed back to the sending node as a Response Packet.

The vast number of packets circulating through a computer network can cause crowding and bottlenecking of the data. If the node receiving a Request Packet or Response Packet has insufficient buffering available to accept such a packet, the packet must be retransmitted. As data crowding occurs, more and more packets must be retransmitted, congesting the network even more. There is a need in the art for mechanisms to control the data traffic in order to decrease the effects of congestion. Because traffic fluctuates through time, this mechanism should adapt to the changing data flow conditions on the network. Additionally, this mechanism should allow the speed of congestion control to be adjusted.

SUMMARY OF THE INVENTION

The present invention provides a method and a mechanism for regulating data traffic on a computer network by controlling data congestion. The invention tracks the number of outstanding requests that are on the network for a given node. Requests are only dispatched onto the network when the number of outstanding requests is below a set maximum limit. Additionally, the mechanism allows the system's I/O buffers to be flexibly partitioned among several virtual I/O channels.

Data congestion is indicated by the requests arriving at the recipient node while there is insufficient buffering available to accept the packet, termed "busying the packet." Traffic sparseness is indicated by the requests arriving at the recipient node when it is not busy. The present invention counts the number of times that the requests arrive busied and not busied. When too many request packets are busied before being delivered, the network is too congested and the maximum number of undelivered requests allowed for the transfer is decreased. When too many request packets are delivered without being busied, the network traffic may be too sparse, and the maximum number of undelivered requests allowed for the transfer is increased. Similarly, a count is also made of response packets being busied or not busied in order to regulate congestion.

BRIEF DESCRIPTION OF THE DRAWINGS

FIG. 3A is a table describing the ten memory registers maintained by the invention for each channel of data of a client computer.

FIG. 3B is a table describing the six memory registers maintained by the invention to control congestion on the channel.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and to use the invention, and it is to be understood that other embodiments may be utilized and that changes may be made without departing from the spirit and scope of the present invention. The following Detailed Description is, therefore, not to be taken in a limiting sense and the scope of the present invention is defined by the appended claims. In the following figures, elements numbered alike represent substantially the same elements.

Figure 1:
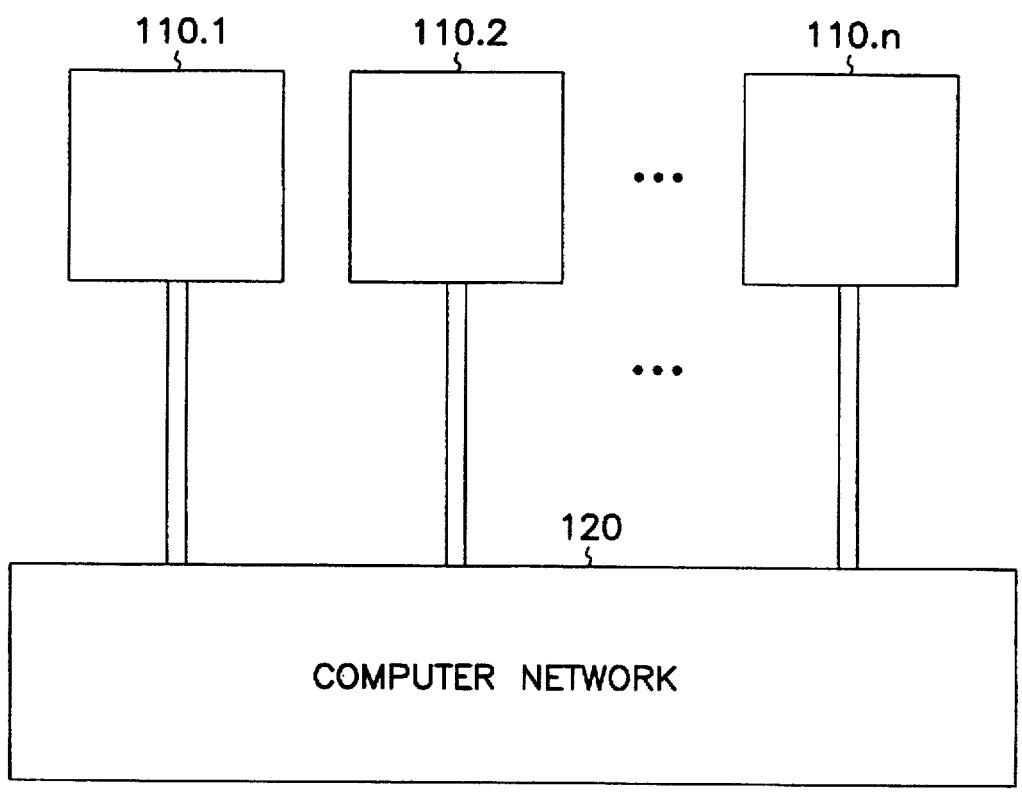
FIG. 1 is a block diagram of a plurality of client computers connected across a network.
Figure 2:
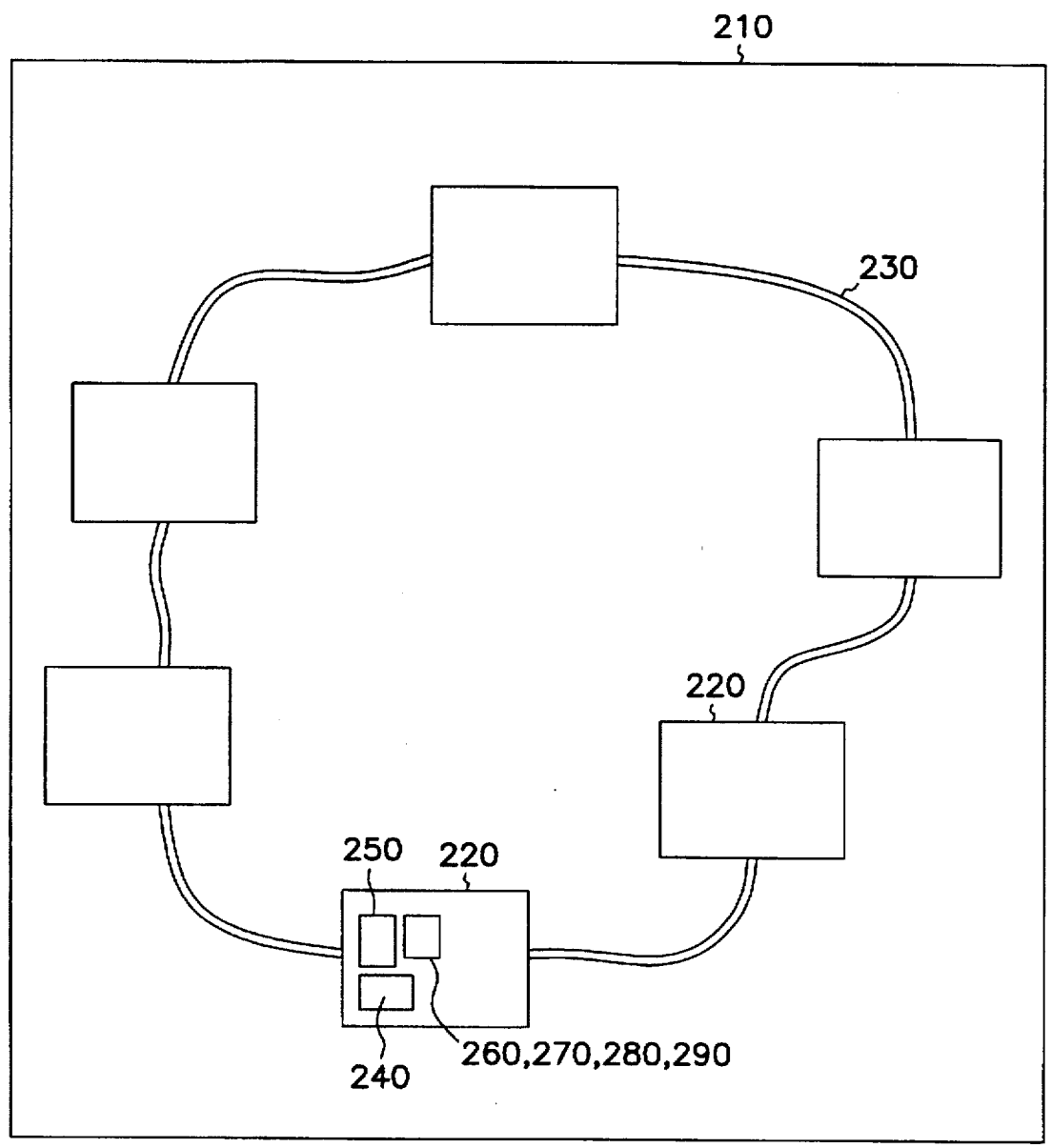
FIG. 2 is a block diagram of an interconnected computer ring network system made up of a plurality of nodes of client computers.

FIG. 1 shows a series of computer nodes 110 interconnected by a computer network 120. FIG. 2 demonstrates one embodiment of a computer network system 210, featuring a plurality of computer nodes 220 connected in a closed ring 230. Within each computer node 220 is the congestion control mechanism 240, a set of virtual I/O channels 250, four sets of I/O buffers 260 through 290, and a set of memory mapped registers (MMRs) 295. Congestion control mechanism 240 regulates the network traffic by adjusting the flow of data from computer node 220 to network 230. I/O buffers 260 are capable of being partitioned among the computer's virtual I/O channels 250.

Network traffic which is regulated by congestion control mechanism 240 consists of peer-to-peer messaging and direct memory access (DMA). Peer-to-peer messages allow short (up to 32 words), unsolicited data exchanges with no target buffer reservations. DMA allows one computer node 220 to directly read or write arbitrary blocks of data in another computer node's memory. In one embodiment, network 230 can be a reconfigurable ring-based peripheral channel.

Such a channel is described in "Reconfigurable Ring-Based Network," U.S. patent application Ser. No. 08/614,860 filed herewith, the details of which are incorporated by reference.

In such a peripheral channel, data packets include a 16-byte header containing nodeIDs for the target and source, a packet command, a sequence number, special packet control information, flow information used only by the network, and a client address. A data payload of 1 to 32 64-bit words may optionally be included. Packet types are differentiated by their command values. The MsgPkt is used for peer-to-peer messages. Longer messages can be implemented either by breaking them up into multiple MsgPkts, which then must be reassembled, or by pre-arranging buffer locations and using DMA operations.

A device on a peripheral channel may read from or write to the memory in another device on the peripheral channel using DMA transfers. DMA is performed through ReadBlk and WriteBlk operations. ReadBlk operations allow a DMA master to read data directly from a DMA slave's memory without operating system intervention. The ReadBlkInit is required to pre-negotiate transfer speed and because certain clients require knowledge of the whole transfer before the individual read operations occur.

After receiving the ReadBlkInitResp, the DMA master performs a series of Reads, receiving the data in ReadResps. When all ReadResps have returned, the master signals completion via a ReadBlkDone, and the slave may clear any state it might have associated with the transfer. Some additional processing and/or notification will likely take place at this point. For example, if an external device were doing a ReadBlk in response to an operating system generated I/O request, it may now write the data out to a peripheral or network and then notify the operating system via a peer-to-peer message.

WriteBlk operations are handled similarly to ReadBlk operations. The WriteBlkInit is used to negotiate an initial transfer speed and set up any necessary state in the slave. The master performs a series of Writes, and counts the returned WriteResps. A WriteResp indicates only that the Write was received, not necessarily that the data has been fully written into the slave's memory. When all WriteResps have been received, the master sends a WriteBlkDone. The slave sends the WriteBlkDoneResp to indicate that all previous Writes have completed locally.

Read and Write commands can operate on data sizes between 1 and 32 64-bit words. The data size is specified via a 5-bit subfield within the Command field of the packet. Such DMA transfers, whose data requests are controlled by congestion control mechanism, are discussed in more detail in "Input/Output System and Method for a Massively Parallel Processor," U.S. patent application Ser. No. 08/614,859, filed herewith, the details of which are incorporated by reference.

Figure 3:
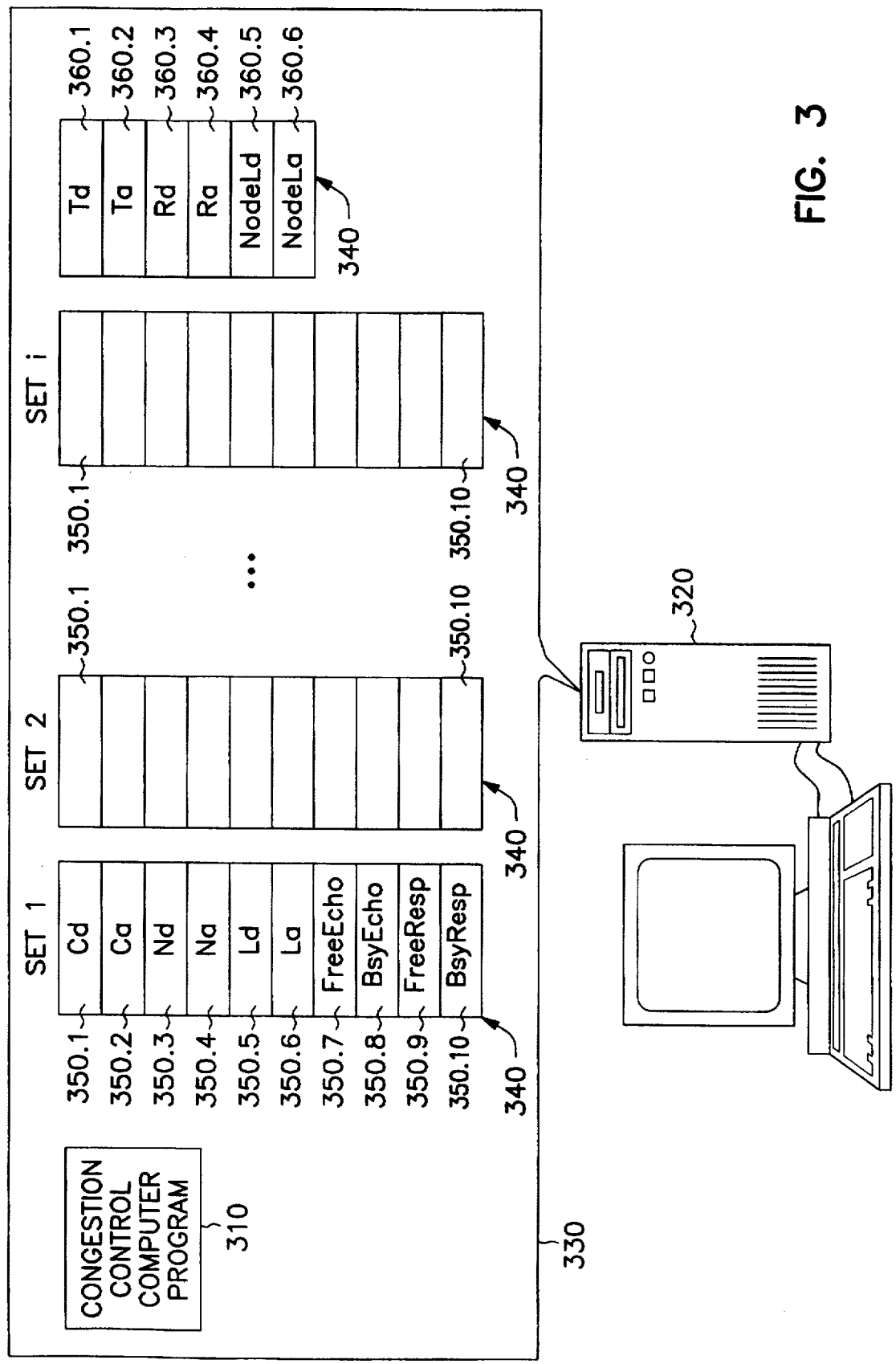
FIG. 3 is a representation of one node of a network, showing the client computer and the congestion control mechanism stored in its memory unit.

FIGS. 3, 3A, and 3B illustrate one embodiment of the congestion control mechanism. This embodiment is a software process 310 stored in the computer's 320 memory 330. Congestion control mechanism 310 uses a set of memory registers 340 to track the level of congestion on the network.

In one embodiment, the network node computers can handle several channels of communication concurrently. In such an embodiment, computer 320 will assigns ten memory registers 350 for each channel of communication. Computer 320 also maintains six general memory registers 360.

Undelivered Requests and Unanswered Requests

In order for the mechanism to control congestion, memory registers 350 track two items: the undelivered requests and the unanswered requests. To define these, follow the simplified steps of a single communication exchange on a type of ring network in which the ring provides data movement in only a single direction and where the client computers are connected to the ring by network node chips, such as the network described in "Reconfigurable Ring-Based Network," U.S. patent application Ser. No. 08/614,860.

Suppose that Client A needs data stored in Client B's memory. In general, Client A transmits a Request Packet to its network node chip. The node chip dispatches the Request Packet on the network. This increases by one the number of undelivered requests and unanswered requests. The Request Packet is routed around the network through each intermediary node. After being routed around the ring, the Request Packet finally reaches the node associated with Client B, and is removed from the network by the node chip. If the node chip has sufficient buffering available to accept the packet, then the node chip sends an acknowledgement, in the form of an Echo Packet, back to the node chip associated with Client A. If the node chip at Client B is unable to accept the packet, then a negative acknowledgement, in the form of a Busy Echo, is returned to the node chip associated with Client A. In this case, the node chip at Client A must retransmit the packet, and this process is repeated until an Echo Packet is returned.

Once an Echo Packet is received by Client A's node chip, Client A is notified via a ClientEcho. This ClientEcho is either a busied ClientEcho, indicating that the request packet was busied, or it is a non-busied ClientEcho, indicating that the request packet was not busied. In other embodiments, some process other than Echo Packets and ClientEchoes might be used to notify a Client of packet acceptance. At this point, the number of undelivered requests has decreased by one since this Request has been received and acknowledged by Client B.

Now Client B must retrieve the requested data from its memory and send the answer data to Client A in the form of a Response Packet. The Response Packet is routed around the network through each intermediary node. After being routed around the ring, the Response Packet finally reaches the node associated with Client A, and is removed from the network by the node chip. If the node chip has sufficient buffering available to accept the packet, then the node chip sends an acknowledgement, in the form of an Echo Packet, back to the node chip associated with Client B. If the node chip at Client A is unable to accept the packet, then a negative acknowledgment, in the form of a Busy Echo, is returned to the node chip associated with Client B. In this case, the node chip at Client B must retransmit the packet, and this process is repeated until an Echo Packet is returned. Whenever the Response Packet is accepted by Client A, the request has been answered and so the number of unanswered requests has decreased by one.

Undelivered requests and unanswered requests represent the volume of data traffic on the network for that computer node. As the traffic increases and nodes are more frequently acting upon data requests, congestion occurs when new requests arrive and must be returned with Busy Echoes or when the number of unfulfilled answers increases such that sending an answer packet generates a busy response. Congestion control mechanism 240 regulates congestion by stepping in and decreasing the number of undelivered and unanswered requests allowed whenever the system is too busy. The number of possible undelivered and unanswered requests are increased when the system is more free. For example, as Request Packets are busied, to avoid wasting buffering space and channel bandwidth by such Request Packets, congestion control mechanism 240 reduces the allowable number of undelivered Request Packets on the channel. This is a good method of regulating congestion for WriteBlocks (operations which transfer a block of memory to be written to the memory of a remote node), in which the bulk of the data is carried in the Request Packets. Similarly, as Response Packets are busied, to avoid wasting buffering space and channel bandwidth by such Response Packets, congestion control mechanism 240 reduces the allowable number of unanswered requests. This is a good method of regulating congestion for ReadBlocks (operations which transfer a block of memory to be read from the memory of a remote node) and transfers involving bridges to other networks. In both of these cases, congestion can occur after the Request Packets are delivered. The congestion control mechanism adaptively regulates congestion of ReadBlock Response Packets, reducing the allowable unanswered requests when Response Packets are busied. Congestion on remote channels for a direct memory access (DMA) transfer involving a bridge is not adaptively regulated, but is limited by the limit on the number of unanswered requests for the transfer.

Congestion Control

One embodiment of congestion control mechanism 240 is shown by the following pseudo code:

|  | Action | Comment |
| --- | --- | --- |
| Event A<br>Send a request | + + Cd<br>+ + Ca | Must satisfy (Cd < Nd) and (Ca < Na) |
| Event B<br>Receive a busied<br>ClientEcho | - - Cd<br>If (+ + BsyEcho = = Td)<br>{Nd = max(Nd - 1, 1)<br>BsyEcho = 0} | May need to throttle the number of undelivered requests. |
| Event C<br>Receive a<br>non-busied<br>ClientEcho | - - Cd<br>If<br>(+ + FreeEcho = = Rd)<br>{Nd = min(Nd + 1, Ld)<br>FreeEcho = 0} | May need to ratchet up the number of undelivered requests |
| Event D<br>Receive a busied<br>response packet as<br>an answer | - - Ca<br>If (+ + BsyResp = = Ta)<br>{Na = max(Na - 1, 1)<br>BsyResp = 0} | May need to throttle the number of unanswered requests |
| Event E<br>Receive a<br>non-busied response<br>packet as an answer | - - Ca<br>If (+ + FreeResp = = Ra)<br>{Na = min(Na + 1, La)<br>FreeResp = 0} | May need to ratchet up the number of unanswered requests |

Congestion control mechanism 240 tracks the status of data requests for a given direct memory access (DMA) transfer. Multiple separate DMA transfers, each using congestion control mechanism 240 independently, may be using the same virtual channel 250. Therefore, for each virtual I/O channel 250 in use by the client computer, there may be multiple instantiations of congestion control mechanism 240. For this explanation, only the congestion control of a single DMA transfer on a single virtual I/O channel 250 will be followed.

The Cd register 350.1 is used to count the number of outstanding undelivered requests and the Ca register 350.2 tracks the number of outstanding unanswered requests. When the client wants to send a request packet on the network to another node (Event A), the packet can only be sent if the client hasn't reached the maximum number of undelivered requests allowed on the channel (Cd<Nd 350.3) and the client hasn't reached the maximum number of unanswered requests allowed on the channel (Ca<Na 350.4). If either maximum has been met, then the packet must wait. When the packet is sent, the count of the number of undelivered requests and the number of unanswered requests are increased by one each (++Cd;++Ca).

The request packet is received by the recipient node and is acknowledged by an echo packet which is delivered to the Client by its node as a ClientEcho. If the node was initially busy, then the echo will return as a busied ClientEcho, otherwise it returns as a non-busy ClientEcho. The ClientEcho indicates that there is now one less request packet pending on the channel and so the register counting the number of undelivered requests is decremented by one (—Cd).

If the ClientEcho was busied (Event B), it means that the traffic is getting congested. The BsyEcho register 350.8 is incremented to track this (E.g.,++BsyEcho). If the number of BsyEchoes is at the threshold (Td 360.1), then the current maximum number of undelivered requests allowed on the channel (Nd 350.3) is throttled back (i.e., decremented) and the BsyEcho count is restarted (E.g., Nd=max(Nd-1, 1); BsyEcho=0).

If the ClientEcho was not busied (Event C), it means that the traffic is still sparse. The FreeEcho register 350.7 is incremented to track this fact (E.g.,++FreeEcho). If the number of FreeEchoes is at the threshold (Rd 360.3), then the current maximum number of undelivered requests allowed on the channel is ratcheted up (i.e., incremented) and the FreeEcho counter is restarted, (E.g., Nc=min(Nd+1, Ld); FreeEcho=0). This maximum number can only go to its upper limit allowed (Ld 350.5).

The request is processed by the recipient node and an answer, in the form of a response packet, is sent by the recipient node to the Client node. If the Client has sufficient buffer space available when the response packet arrives, then the packet will be accepted as a non-busy response packet. If the Client has insufficient buffer space available to accept the response packet when it arrives, then the packet will be busied and retransmitted. When the packet is eventually accepted, it will arrive as a busied response packet. The response packet indicates that there is now one less unanswered request and so the register counting the number of unanswered requests is decremented by one (E.g.,—Ca).

If the response packet was busied (Event D), it means that the channel is getting congested. The BsyResp register 350.10 is incremented to track this, (E.g.,++BsyResp). If the BsyResp is at the threshold for the channel having too many response answers being busy (Ta 360.2) then the current maximum number of unanswered requests (Na 350.4) is throttled (E.g., Na=max(Na-1, 1); BsyResp=0) and the BsyResp register is restarted.

If the response answer packet was not busied (Event E), then it means that the channel is relatively free. The FreeResp register 350.9 is incremented, (E.g.,++FreeResp). If the FreeResp is at its threshold (Ra 360.4), then the current maximum number of unanswered requests is ratcheted up by one (E.g., Na=max(Na-1, 1); BsyResp=0) and the BsyResp register is restarted. However, this maximum number can only go to its upper limit allowed (Ls 350.6).

Acting upon these five events thus allows data congestion on the network to be controlled.

Tuning the Congestion Control

Congestion control mechanism 240 is adaptive since it can be tuned to workload-specific circumstances. Such tuning is achieved by configuring the values of six memory registers. The first two of these registers, NodeLd 360.5 and NodeLa 360.6, represent the maximum number of undelivered request packets and unanswered requests that are needed for a transfer involving the client. These registers are used to establish the Ld 350.5 and La 350.6 registers, respectively and thus are used to start the congestion control process at approximately the proper rates. In addition to their use in congestion control, NodeLd 360.5 and NodeLa 360.6 can be set artificially low to prevent a client from consuming its fair share of channel bandwidth on a long-term basis. This can be useful in networks in which certain clients need connectivity but must be prevented from interfering with critical system traffic.

The remaining four registers, Td 360.1, Ta 360.2, Rd 360.3 and Ra 360.4 represent the dynamic throttling and ratcheting characteristics of the congestion control mechanism. Td and Rd control the client's sensitivity to congestion encountered by request packets. Ta and Ra control the client's sensitivity to congestion encountered by response answer packets.

Since every Td busied echoes cause Nd to decrement, and every Rd non-busied echoes cause Nd to increment, Nd will approach a value that causes at least $((Rd) / (Rd+Td))$ of all request packets to be accepted on the first try, and at most $((Td) / (Rd+Td))$ of all request packets to be busied at least once before being accepted. For example, with Td set to 1 and Rd set to 9, under contention, Nd will approach a value that causes 90% of all request packets to be not busy on the first attempt. The one exception to this is that the lowest Nd will go to is a single (1) undelivered request packet, so that for very congested targets, it is possible to have a single outstanding packet get busied repeatedly.

In this way, the ratio of Td to Rd determines the operating point of the transfer (percentage of request packets delivered on the first try) under contention. The absolute values of Td and Rd themselves determine the sensitivity to changing traffic conditions. Small Td and Rd values will cause the value of Nd to fluctuate rapidly and adjust quickly to increases or decreases in congestion. Larger values of Td and Rd will cause the channel to react more slowly to changing conditions.

Ta and Ra operate analogously to Td and Rd. Ta and Ra regulate Na according to response answer packets rather than echoes. By using these relationships between the registers, congestion control mechanism 240 can be tuned to specific needs.

Flexible Buffer Partitioning

Congestion control mechanism 240 reduces contention between multiple streams on the same virtual channel and helps prevent excessive retry traffic from wasting channel bandwidth when a target is temporarily congested. Flexible buffer partitioning can also be used, either in conjunction with the congestion control method described above, or by itself, to control congestion. In flexible buffer partitioning, instead of a single channel, multiple virtual I/O channels 250 having configurable I/O buffers 260 are used. Multiple virtual I/O channels 250 offer a flexible means to reduce contention between different types of transfers from and to a computer client.

Figure 4:
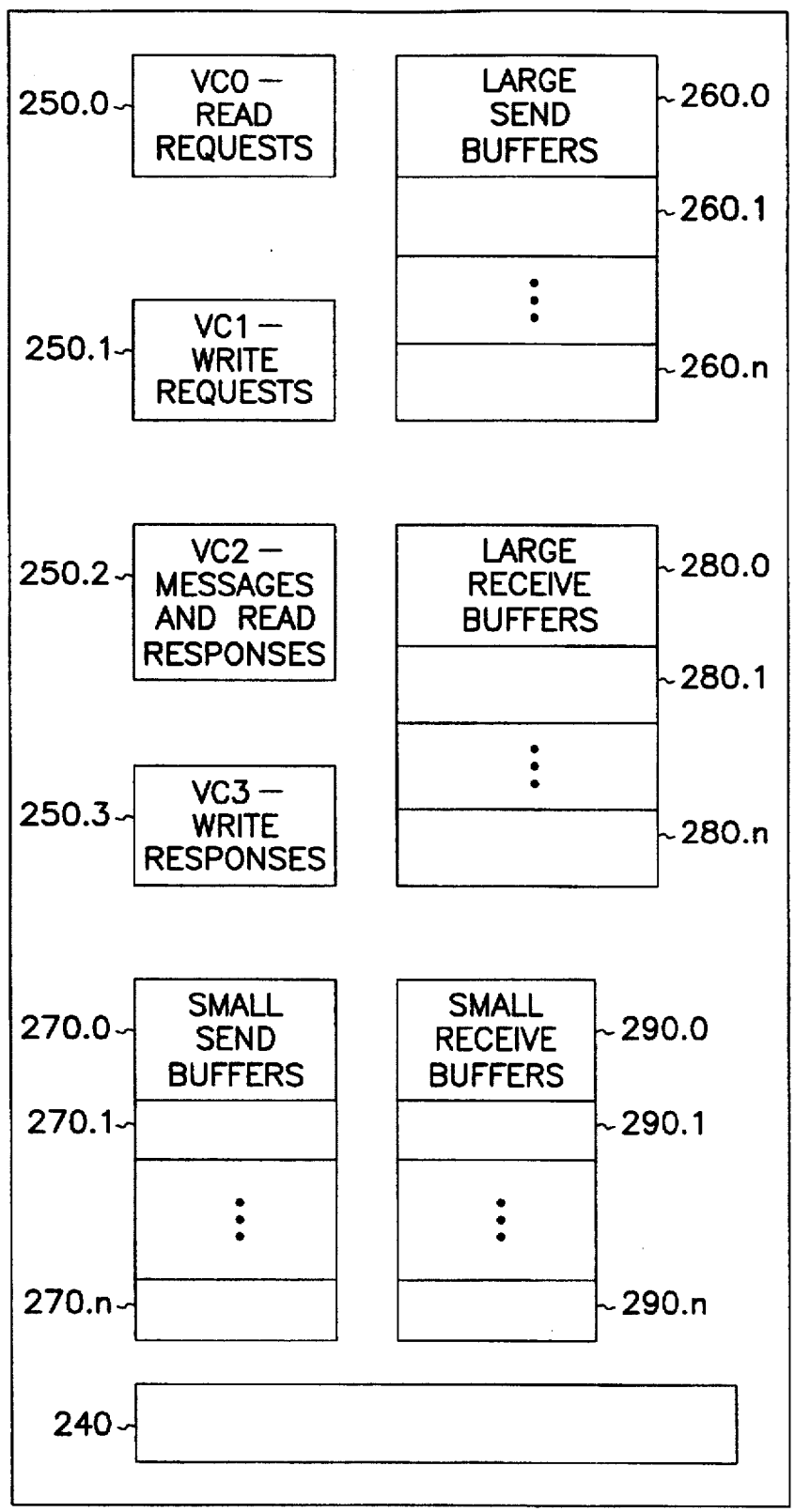
FIG. 4 shows a node of the network in more detail, showing the set of virtual I/O channels and the sets of partitionable I/O buffers.

In one embodiment, there are four virtual I/O channels 250 for communication with the network. FIG. 4 shows a representation of virtual I/O channels 250.0 through 250.3, each of which may be paired with, or operate independently of, congestion control mechanism 240. In one embodiment, flexible buffer partitioning creates a number of virtual I/O channels 250, each of which is assigned a particular function. In FIG. 4, the four virtual channels are loosely separated into a read request channel (VC0) 250.0, a write request channel (VC1) 250.1, a channel for messages and read responses (VC2) 250.2 and a channel for write responses (VC3) 250.3.

In addition, FIG. 4 shows a set of large send buffers 260.0 through 260.n used for sending large data packets and a set of small send buffers 270.0 through 270.n for sending small data packets. Each computer also contains a set of large receive buffers 280.0 through 280.n for recieving large data packets and a set of small receive buffers 290.0 through 290.n for receiving small data packets. In one such embodiment, 10 large send buffers 260 and 10 small send buffers 270 are partitioned among virtual I/O channels 250. In other embodiments, more or less buffers can be implemented.

Buffers 260, 270, 280 and 290 are partitioned by setting bitmasks stored in designated memory mapped registers (MMRs) 295. The set of buffers usable by each virtual channel can overlap in arbitrary ways; some buffers may be dedicated to a single virtual channel 250, some buffers may be shared by a set of virtual channels 250, and some buffers may be shared by all virtual channels 250. However, at least one buffer must be reserved for response packets. This requirement is in order to avoid deadlock.

Send Buffers

Figure 5A:
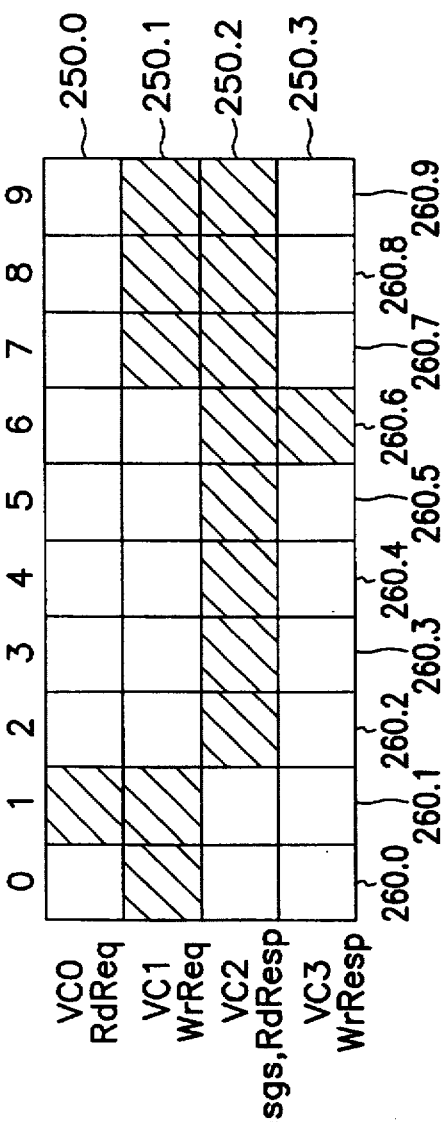
FIGS. 5A and 5B show an example of send buffer partitioning for a computer whose outgoing data traffic is mostly response packets
Figure 5B:
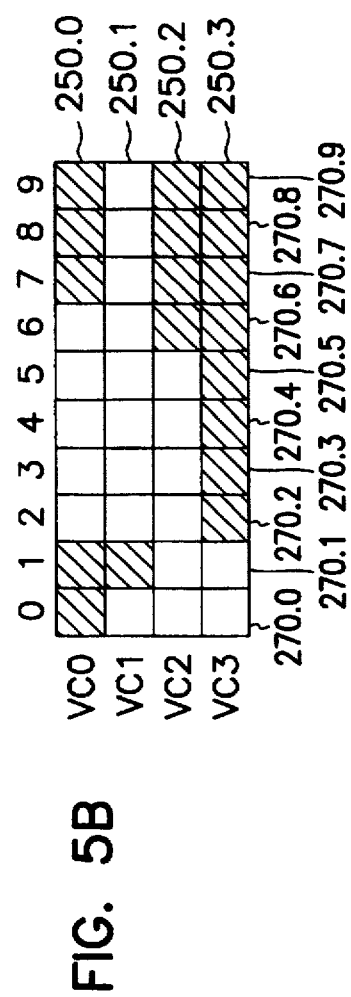

FIGS. 5A and 5B show an example of send buffer partitioning for a client computer whose outgoing data traffic is mostly response packets, and FIG. 6 shows an example of receive buffer partitioning for the same type of client. These figures are representational only; the buffers can be partitioned in different combinations in other embodiments or at other points of time within the same network. As can be seen in FIGS. 5A and 5B, ten large send buffers 260.0 through 260.9 and ten small send buffers 270.0 through 270.9 are partitioned among virtual channels 250.0 through 250.3. Because most of the outgoing traffic will be response packets, read responses will tend to use large send buffers 260 and write responses will use small send buffers 270.

Large send buffers 260 will be used primarily for read response packets, message packets and write packets. Thus, large send buffers 260 are primarily partitioned between virtual channel 1 250.1 and virtual channel 2 250.2, with some dedicated buffers (260.0 and 260.1 for 250.1 and 260.2 through 260.6 for 250.2) used to isolate the virtual channels from each other. Several shared buffers 260.7 through 260.9 are reserved for dynamic allocation.

Since read request data traffic is expected to use small send buffers 270 in most cases, only a single large send buffer 260.1 is made available for virtual channel 0. Similarly, since no data traffic on virtual channel 3 is expected to use send large buffers, only a single large send buffer 260.3 is made available. Virtual channels 2 and 3 both have large send buffers 260 available that cannot be used by either of the two request virtual channels 250.0 or 250.1. This is necessary to prevent deadlock.

Small send buffers 270 are partitioned similarly to large send buffers 260, except that the read request and write response traffic is expected to be the primary small send buffer user. Thus, two small send buffers 270.0 and 270.1 are reserved for virtual channel 0, five small send buffers 270.2 through 270.6 are reserved for virtual channel 3, and three small send buffers 270.7 through 270.9 are shared by channels 0, 2 and 3. Very little write request traffic is expected to use small send buffers 270, so only one small send buffer 270.1 is available for virtual channel 1. Read response and message traffic use of small send buffers 270 is expected to be low, so only three shared buffers 270.6 through 270.9 are allocated to virtual channel 2. To prevent deadlock, small send buffer 270.6 is available for both response virtual channels, but is not available to the request virtual channels.

Packets consume send buffers from the bottom up. A packet arriving from the computer will use the lowest available send buffer that its mask allows. Therefore, the buffers should be partitioned, generally, with the dedicated ones having lower numbers and the shared buffers having the higher numbers. This keeps the shared buffers available for dynamic allocation.

Receive Buffers

When a send packet arrives at its target node, it is placed in a receive buffer 280 and 290 according to its virtual channel 250. Like send buffers 260 and 270, the receive buffers 280 and 290 are partitioned among virtual channels 250 by a software controlled bitmask stored in memory mapped registers 295.

Figure 6A:
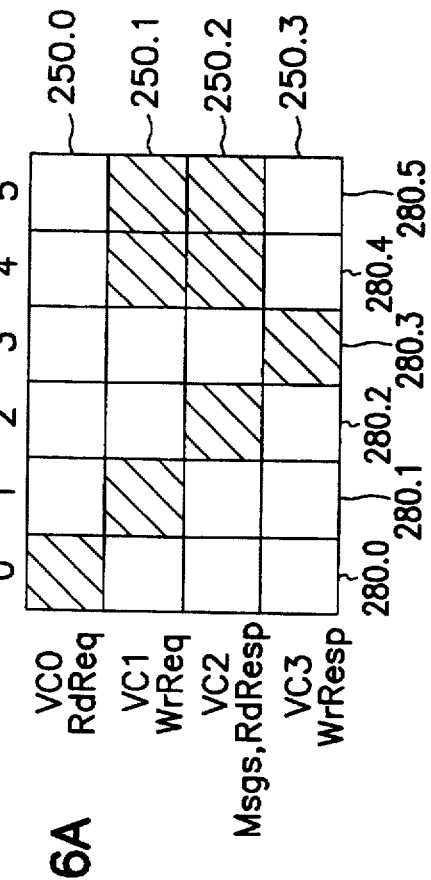
FIGS. 6A and 6B show an example of receive buffer partitioning.
Figure 6B:
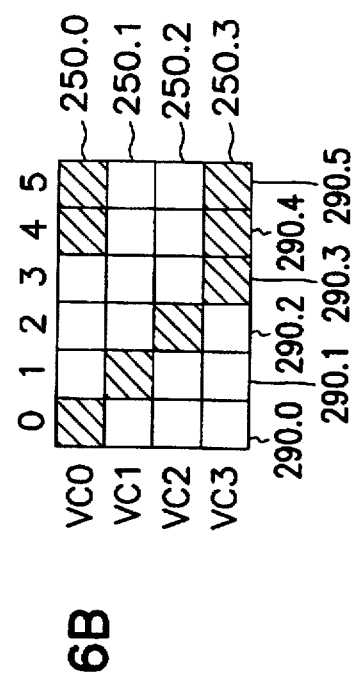

FIGS. 6A and 6B show an example configuration for the partitioning of receive buffers 280 and 290. A large receive buffer 280 and a small receive buffer 290, is dedicated to each virtual channel 250. For instance, large receive buffer 0 280.0 and small receive buffer 0 290.0 are dedicated to virtual channel 0. This ensures that the queue reservation protocol will operate correctly and independently for each virtual I/O channel 250. The queue reservation protocol is a system which utilizes a retransmission status flag to guarantee that all packets transmitted to a node on a particular virtual channel will eventually be accepted.

The remaining two large receive buffers 280.4 and 280.5 are shared by virtual channels 1 and 2. Two remaining small receive buffers 290.4 and 290.5 are shared between virtual channels 0 and 3. As with send buffers 260 and 270, receive buffers 280 and 290 are allocated from the bottom up. Thus, dedicated receive buffers should be placed at the bottom, with shared receive buffers higher up.

Other embodiments of the congestion control mechanism are possible without departing from the scope and spirit of the present invention. For example, congestion control could be provided on an integrated circuit rather than as a computer program stored in RAM. Or, a different number of I/O buffers 240 could be partitioned among a different number of virtual I/O channels 250. Finally, flexible buffer partitioning could be used either with or without adaptive congestion control to regulate network traffic.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

We claim:

1. A method for controlling data congestion on a computer system having a plurality of client computers, including a first and second client computer, connected across a network, comprising the steps of:

defining a threshold number of requests allowed at one time by said first client computer;

defining a threshold number of busy echoes allowed;

defining a threshold number of non-busy echoes allowed;

defining a number of active requests;

receiving a request from the first client computer;

if the number of active requests is less than the threshold number of requests allowed, dispatching the request, wherein the step of dispatching comprises the steps of:

sending the request on the computer network to said second client computer; and incrementing the number of active requests;

receiving a signal from the network when the request is successfully received by the second client, indicating whether the request was busied prior to delivery;

if the signal indicates that the request was busied, adjusting the threshold number of requests allowed if the threshold number of busy echoes has been reached; and if the signal indicates that the request was not busied, adjusting the threshold number of requests allowed if the threshold number of non-busy echoes has been reached.

2. The method for controlling data congestion on a computer system as recited in claim 1 wherein the method further comprises the steps of:

defining a threshold number of outstanding answers allowed at one time by said first client computer;

defining a threshold number of busy answers allowed;

defining a threshold number of non-busy answers allowed;

incrementing the number of active answers when the request is dispatched;

receiving an answer from the second client computer for a prior request;

if the answer was busied, adjusting the threshold number of outstanding answers allowed if a threshold of busied answers has been reached;

if the answer was not busied, adjusting the threshold number of outstanding answers allowed if a threshold of non-busied answers has been reached; and wherein the step of dispatching further comprises the step of waiting until the number of active answers is less than the threshold number of outstanding answers allowed before sending the request on the network to said second client computer.

3. The method for controlling data congestion on a computer system as recited in claim 2 wherein the step of defining a threshold number of requests includes the step of adjusting the threshold number of requests allowed at one time by the first computer in order to restrict the first client computer's available bandwidth; and wherein the step of defining a threshold number of outstanding answers includes the step of adjusting the threshold number of outstanding answers allowed at one time by the first client computer in order to restrict the first computer's available bandwidth.

4. The method for controlling data congestion on a computer system as recited in claim 2 wherein the step of adjusting the threshold number of requests includes the step of setting, at initialization, the initial upper limit to which the threshold can be adjusted; and wherein the step of adjusting the threshold number of outstanding answers includes the step of setting at initialization, the initial upper limit to which the threshold can be adjusted.

5. The method according to claim 2 wherein the step of receiving an answer includes the step of decrementing the number of active answers.

6. The method for controlling data congestion on a computer system as recited in claim 1 wherein the step of defining a threshold number of requests includes the step of adjusting the threshold number of requests allowed at one time by the first client computer in order to restrict the first client computer's available bandwidth.

7. The method for controlling data congestion on a computer system as recited in claim 1 wherein the step of adjusting the threshold number of requests includes the step of setting, at initialization, the initial upper limit to which the threshold can be adjusted.

8. The method according to claim 1 wherein the step of receiving a signal includes the step of decrementing the number of active requests.

9. In a computer having a memory, a congestion control device for controlling message traffic to and from the computer on a network, the device comprising:

a congestion control program stored in the memory, wherein the congestion control program performs the tasks of:

defining a threshold number of requests allowed at one time by said computer;

defining a threshold number of busy echoes allowed;

defining a threshold number of non-busy echoes allowed;

defining a number of active requests;

receiving a request;

if the number of active requests is less than the threshold number of requests allowed, dispatching the request, wherein the step of dispatching comprises the steps of:

sending the request on the network; and incrementing the number of active requests;

receiving a signal from the network when the request is successfully received, said signal indicating whether the request was busied prior to delivery;

if the signal indicates that the request was busied, adjusting the threshold number of requests allowed if the threshold number of busy echoes allowed has been reached; and if the signal indicates that the request was not busied, adjusting the threshold number of requests allowed if the threshold number of non-busy echoes allowed has been reached.

10. The congestion control device as recited in claim 9 wherein the step of defining a threshold number of requests allowed includes the step of reducing the threshold number of requests allowed at one time by the computer in order to restrict available bandwidth for access by the computer to the network.

11. The congestion control device as recited in claim 9 wherein the step of adjusting the threshold number of requests includes the step of setting, at initialization, the initial upper limit to which the threshold can be adjusted.

12. The congestion control device as recited in claim 9 wherein, the congestion control program stored in the memory further performs the tasks of:

defining a threshold number of outstanding answers allowed at one time by said computer;

defining a threshold number of busy answers allowed;

defining a threshold number of non-busy answers allowed;

defining a number of active answers;

incrementing the number of active answers when the request is dispatched;

receiving an answer;

if the answer was busied, adjusting the threshold number of outstanding answers allowed if the threshold number of busy answers allowed has been reached; and if the answer was not busied, adjusting the threshold number of outstanding answers allowed if the threshold number of non-busy answers allowed has been reached;

wherein the step of dispatching further comprises the step of waiting until the number of active answers is less than the threshold number of outstanding answers allowed before sending the request on the network.

13. The congestion control device as recited in claim 12 wherein the step of defining a threshold number of requests allowed includes the step of reducing the threshold number of requests allowed at one time by the computer in order to restrict the available bandwidth for access by the computer to the network; and wherein the step of defining a threshold number of outstanding answers allowed includes the step of reducing the threshold number of outstanding answers allowed at one time by the computer in order to restrict the available bandwidth for access by the computer to the network.

14. The congestion control device as recited in claim 12 wherein the step of adjusting the threshold number of requests includes the step of setting, at initialization, the initial upper limit to which the threshold can be adjusted; and wherein the step of adjusting the threshold number of outstanding answers includes the step of setting at initialization, the initial upper limit to which the threshold can be adjusted.

15. The method according to claim 12 wherein the task of receiving an answer includes the task of decrementing the number of active answers.

16. The method according to claim 9 wherein the task of receiving a signal includes the task of decrementing the number of active requests.

17. A system for data communications, comprising:

a plurality of client computers, including a first client computer;

a network connecting each of said plurality of client computers;

wherein the first client computer comprises a congestion control device; wherein the congestion control device comprises:

a request dispatcher;

means for counting a current number of active requests;

means for defining a threshold number of active requests;

an echo receiver indicating when a request has been successfully delivered;

wherein the request dispatcher includes means for preventing dispatch of a request when the threshold number of active requests has been reached;

wherein the echo receiver includes means for adjusting the threshold number of active requests when a threshold number of busy echoes has been reached; and wherein the echo receiver includes means for adjusting the threshold number of active requests when a threshold number of non-busy echoes has been reached.

18. The system for data communications as recited in claim 17 wherein the congestion control device further comprises:

means for counting a current number of outstanding answers;

means for counting a threshold number of outstanding answers;

an answer receiver;

wherein the request dispatcher includes means for preventing dispatch of a request when the threshold number of outstanding answers has been reached;

wherein the answer receiver includes means for adjusting the threshold number of outstanding answers when a threshold number of busy answers has been reached; and wherein the answer receiver includes means for adjusting the threshold number of outstanding answers when a threshold number of non-busy answers has been reached.

19. The system for data communications as recited in claim 18 wherein the congestion control device further comprises means for setting a limit on the threshold number of active requests to confine the first client computer's bandwidth; and wherein the congestion control device further comprises means for setting a limit on the threshold number of outstanding answers to confine the first client computer's bandwidth.

20. The system for data communications as recited in claim 18 wherein the echo receiver further comprises means for setting at initialization, the initial upper limit to which the threshold can be adjusted; and wherein the answer receiver further comprises means for setting at initialization, the initial upper limit to which the threshold can be adjusted.

21. The system for data communications as recited in claim 17 wherein the congestion control device further comprises means for setting a limit on the threshold number of active requests to confine the first client computer's bandwidth.

22. The system for data communications as recited in claim 17 wherein the echo receiver further comprises means for setting at initialization, the initial upper limit to which the threshold can be adjusted.

* * * * *

UNITED STATES PATENT AND TRADEMARK OFFICE
CERTIFICATE OF CORRECTION

PATENT NO. : 5,748,900
DATED : May 5, 1998
INVENTOR(S) : Steven L. Scott It is certified that error appears in the above-identified patent and that said Letters Patent is hereby corrected as shown below:

At Col. 10, line 54, please insert "," after "setting".

At Col. 14, line 1, please insert "," after "setting".

At Col. 14, line 4, please insert "," after "setting".

Signed and Sealed this

Third Day of November, 1998

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,748,900

DATED : May 5, 1998

INVENTOR(S) : Steven L. Scott et al.

It is certified that error appears in the above-identified patent and that said Letters Patent is hereby corrected as shown below:

At Col. 12, line 21, please omit "setting at" and insert --setting, at--.

At Col. 14, line 13, please omit "setting at" and insert --setting, at--.

Signed and Sealed this

Fourteenth Day of September, 1999

Attest:

Q. TODD DICKINSON

*Attesting Officer*      *Acting Commissioner of Patents and Trademarks*